United States Patent [19]

Anderson

[11] Patent Number: 4,797,900
[45] Date of Patent: Jan. 10, 1989

[54] MODEM WITH IMPROVED CLOCK CONTROL AND METHOD THEREFOR

[75] Inventor: Steven L. Anderson, Huntsville, Ala.
[73] Assignee: Motorola, Inc., Schaumburg, Ill.
[21] Appl. No.: 91,489
[22] Filed: Aug. 31, 1987
[51] Int. Cl.$^4$ .................... H04L 5/16; H04L 7/04
[52] U.S. Cl. .................... 375/8; 275/111; 275/118
[58] Field of Search .................... 375/8, 9, 106, 52, 53, 375/83, 84, 85, 118, 119, 120, 111

[56] References Cited

U.S. PATENT DOCUMENTS 4,504,802  3/1985  Heatherington ............. 375/52 X
4,559,634  12/1985  Hochschild ..................... 375/9
4,644,561  2/1987  Paneth et al. ................ 375/53 X

*Primary Examiner*—A. D. Pellinen
*Assistant Examiner*—Derek S. Jennings
*Attorney, Agent, or Firm*—Charles L. Warren

[57] ABSTRACT

Modems such as type 201 modems are subject to pattern sensitivity problems caused primarily by different group delay characteristics for the patterns. The method of this invention minimizes such problems by determining different clock phase positions for group delayed patterns and uses same when such patterns are being received. A normal clock phase is determined during training and is used when patterns without substantial group delay are being received.

5 Claims, 3 Drawing Sheets

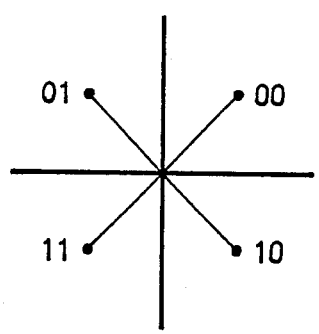
FIG. 1
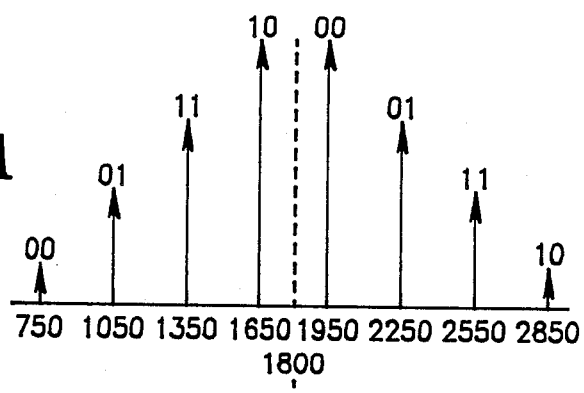
FIG. 2A
FIG. 2B
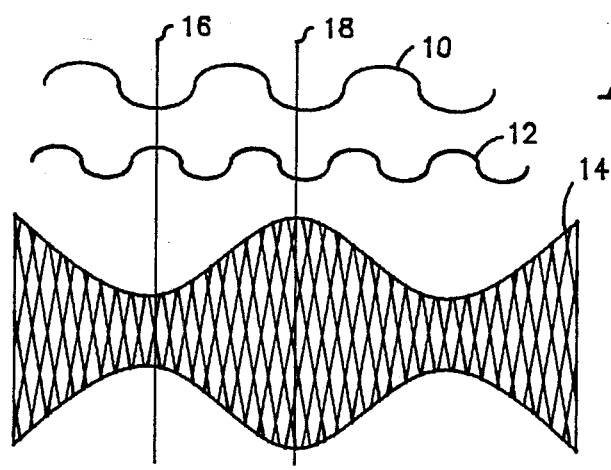
FIG. 3

MODEM WITH IMPROVED CLOCK CONTROL AND METHOD THEREFOR

BACKGROUND OF THE INVENTION

This invention addresses the problem of maintaining a modem receive clock in the proper position. It is especially suited for use in 201 modems which encounter pattern sensitivity problems because neither scrambling nor adaptive equalization is used.

The signalling method used in 201 modems consists of phase shift keying (PSK) to generate the known dibit pattern illustrated in FIG. 1. The transmitted spectrum of the four possible states is shown in FIG. 2A as spectral lines. Typical group delay characteristics of telephone lines with fixed compensation are shown in FIG. 2B relative to the transmitted spectrum and illustrate that the low frequency component of 00 state and the high frequency component of the 10 state will encounter the most severe delays. In a conventional 201 modem a long stream of "bad" patterns, i.e. 00 or 10 states, may cause the receive clock to shift to accomodate the shifted envelopes of these patterns due to the associated group delay. This will usually cause data errors to occur when good patterns, i.e. 11 and 01 states or random data including these states, are transmitted. Such errors are generated because the receive clock was shifted from the normal "correct" position in order to provide better detection of the bad(shifted) patterns and is thus not in the correct position when the good patterns resume.

SUMMARY OF THE INVENTION

It is an object of this invention to minimize the above explained problem by an improved clock positioning method.

In an exemplary method according to the present invention, the modem trains as usual on a series of marks 11 which are sent prior to the transmission of data and a normal clock phase position is determined. An average clock phase position is determined and stored for each of the two bad patterns based upon a predetermined number of clock phase position measurements for each bad pattern (00 and 10 states). The corresponding average clock phase position is used as the clock phase reference for subsequently received bad patterns. The stored bad clock phases prevent the clock from being shifted from the correct position, i.e. as determined after initial training on marks, due to the reception of a large number of bad patterns.

BRIEF DESCRIPTION OF THE DRAWINGS

FIG. 1 graphically represents the four possible dibits used in PSK modem signalling.

FIGS. 2A and 2B illustrate the frequency spectrum of the dibits and typical families of corresponding group delays of compensated telephone lines, respectively.

FIG. 3 illustrates relative envelope patterns for the upper and lower sidebands for each dibit, and a composite envelope.

DETAILED DESCRIPTION

Figure 4:
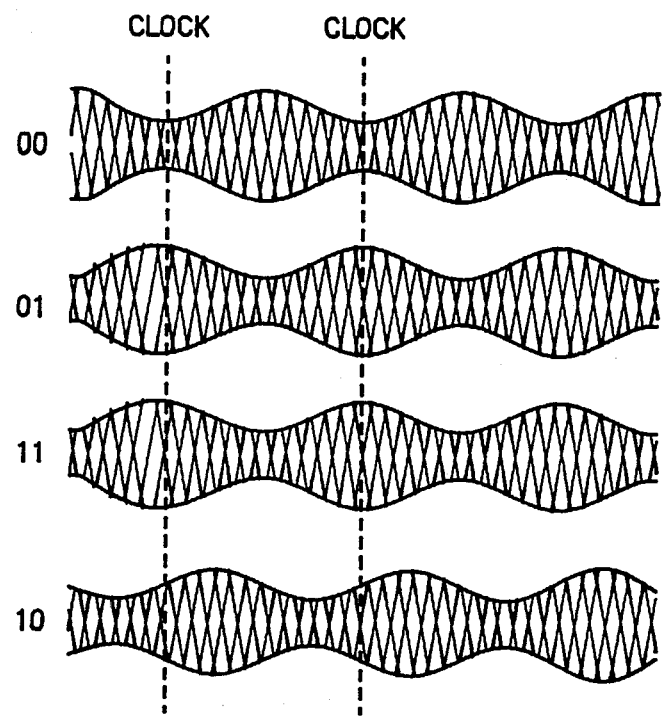
FIG. 4 shows the four envelope patterns for each dibit relative in phase to each other.

FIG. 1 shows the dibit signalling constellation of four equally spaced points relative to the origin. FIG. 2A shows the sideband spectral lines for the PSK dibits relative to an 1800 Hertz (Hz) center frequency. FIG. 2B shows a family of typical group delay characteristics for different telephone lines after normal compensation. It is apparent that the 750 Hz component of the 00 dibit and the 2850 Hz component of the 10 dibit have substantial group delay which is not cancelled by the normal compensation techniques used for 201 modems.

In FIG. 3 the lower sideband 10 and upper sideband 12 of a dibit are shown as individual curves; the composite envelope 14 is shown relative to these curves. At positions 16 and 18 the sidebands are 180 degrees out of phase and in phase, respectively. This corresponds to envelope minima and maxima. In analysis of the problem addressed by this invention, it was concluded that the envelope position or phase is related to the phases of both of the sidebands. If one of the sidebands is substantially effected by group delay, then the envelope will be shifted in phase. Since the 00 and 10 dibits have sidebands at the most extreme portions of the 201 modem spectrum where group delay is the greatest, their envelopes will have the greatest position shifts.

FIG. 4 graphically compares the envelopes of the four dibits relative to a fixed clock position. The clock occurs at envelope maxima for 11 and 01 dibits which indicates that each has incurred relatively insignificant group delay. However, the 00 and 10 dibit envelopes are not near maxima at these clock positions indicating that the sidebands at the extremes of the frequency range encountered substantial group delay.

Figure 5:
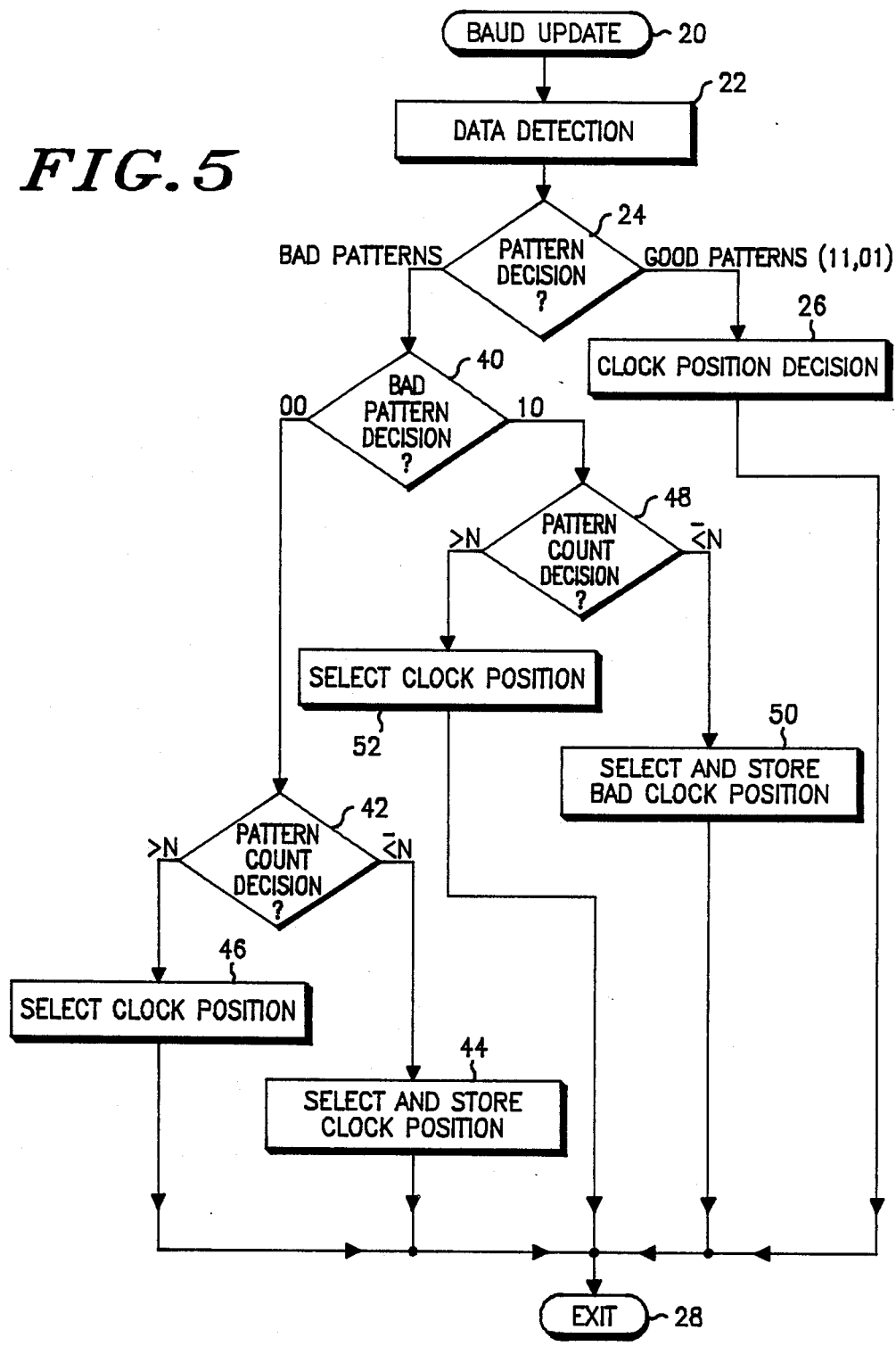
FIG. 5 is a flow chart showing the steps used in an embodiment of this invention to accomplish the improved clock control.

FIG. 5 is a flow chart showing the clock control or training according to the present invention. The chart starts at baud update 20 which indicates that these steps are followed once each baud. Following data detection by block 22, decision branch 24 determines if the data is a good pattern (11, 01) or a bad pattern (00, 10). Upon detection of a good pattern, the clock position decision 26 selects the normal clock phase as was determined during initial training prior to data transmission. Since 201 modems train on a 11 pattern sequence, the clock position for a good pattern should be at an envelope maxima. These steps associated with good pattern detection are finished by exiting at exit 28.

Figure 6:
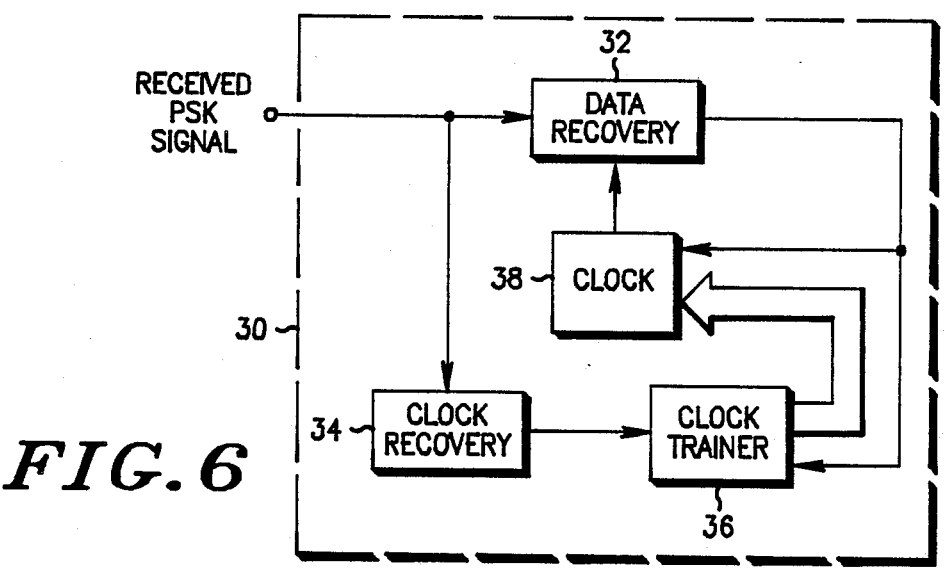
FIG. 6 is a partial block diagram of a modem that incorporates an embodiment of this invention.

An explanation of clock phase control will facilitate an understanding of the remaining steps in FIG. 5. Referring to FIG. 6, a partial block diagram of a modem 30 shows the portions relevant to this invention. The received PSK signal is an input to both data recovery 32 and clock recovery 34. These functions are conventional and can be implemented in hardware or software. The clock phase of the received signal is determined by clock recovery 34 and is an input to clock trainer 36. In the initial training with a 11 pattern prior to data transmission, clock recovery 34 synchronizes to the normal phase.

The purpose of clock trainer 36 is to divide the clock period into a predetermined number of phase positions relative to the normal clock phase. In an exemplary embodiment, 6 possible phase positions were used which divided the 360 degree baud into 60 degree increments. If a good pattern is detected by data recovery 32, clock trainer 36 selects the 0 degree phase position and provides a corresponding signal to clock 38. This causes no phase adjustment by clock 38. Clock 38 may consist of a phase locked loop having a controlable reference signal. The phase selection from trainer 36 controls the phase of the reference signal of clock 38 and thus controls the phase of the clock's output to data recovery 32. The clock trainer is preferably implemented in software.

Referring to FIG. 5, if a bad pattern is detected at branch 24, decision branch 40 further determines which bad pattern was detected. If a 00 pattern was detected, decision branch 42 decides if at least N 00 patterns have been detected since the last initial training. N is at least 1 and is preferably a number of samples such as 4-16. If the 00 pattern has not occurred N times, block 44 is entered. The relative phase difference between the current 00 pattern and the normal clock phase is determined and stored. After N 00 patterns have occurred and the phase differences relative to the normal clock determined, an average phase difference is calculated. The predetermined clock phase position of the clock trainer closest to the calculated average phase different is selected and stored for use with the N+1 and all subsequent 00 patterns. Flow exits via exit 28. For the first N 00 patterns, the clock phase is frozen at the normal clock phase. Since only a limited number N of 00 patterns can occur before an alternate phase is used (as will be explained below), the total effect of using the normal clock phase for N detections of bad patterns is not significant enough to cause incorrect data detection or loss of clock synchronization. Only a small range such as less than 0.1% is needed for clock 38 since both the transmit and receive clocks have crystal controlled reference oscillators.

On the N+1 detection of a 00 pattern as determined by decision branch 42, block 46 selects the predetermined clock phase of the clock trainer closest to the calculated average phase position and provides a corresponding signal to clock 38 which changes the phase of its reference signal. After this selection, control exits via exit 28.

If branch 40 determines that the bad pattern is 10, operation and flow proceeds similarly to that explained for the 00 pattern. Decision branch 48 determines if N previous 10 patterns have occurred; flow proceeds to block 50 is no and to block 52 if yes. Block 50 determines and stores N clock phase measurements, and calculates an average phase based upon the N samples. The same range of N is applicable. Flow exits after the calculation via exit 28. On the N+1 and following bad 10 patterns, block 52 causes the predetermined phase closest to the average phase difference to be selected for use by clock 38. Flow exits via exit 28.

This method requires the recovery of each baud of data before a decision can be made as to clock positioning. Therefore it will be apparent that this method seeks to minimize average clock drift. Only small instantaneous phase corrections can occur during each baud.

The clock training flow chart illustrates the improved steps according to the present invention. These steps are preferably implemented as software and is part of a larger modem software program. However, those skilled in the art will recognize that these steps and functions can alternatively be implemented in hardware.

Although an embodiment of the present invention has been described and illustrated in the drawings, the scope of the invention is described by the claims appended hereto.

What is claimed is:

1. An improved clock positioning method for modems which have pattern sensitivities comprising the steps of:
   determining a normal clock phase position for the clock in said modem during initial training which precedes the transmission of data;
   selecting a first set of data patterns which do not have substantial group delay relative to the normal clock phase position and a second set of data patterns which have substantial group delay relative to the normal clock phase position;
   using the normal clock phase position upon the recovery of patterns in said first set;
   using another clock phase position upon the recovery of a certain pattern in said second set, said another clock phase position being selected to provide phase compensation for the corresponding group delay of said certain pattern, thereby minimizing pattern sensitivities due to different group delays of the data patterns.

2. The method according to claim 1 wherein said another clock phase position is determined by calculating an average clock phase position based upon a plurality of clock phase measurements for each pattern in said second set.

3. The method according to claim 2 further comprising the step of using said normal clock phase position upon recovery of patterns in said second set until said average clock phase position is calculated.

4. A method for minimizing clock synchronization problems in a modem due to group delays of some of the received data patterns comprising the steps of:
   determining a normal clock phase position;
   selecting a first set of data patterns which do not have substantial group delay relative to the normal clock phase position and a second set of data patterns which have substantial group delay relative to the normal clock phase position;
   determining for each pattern in said second set an average clock phase position which compensates for the phase difference between the normal clock phase and the phase of each pattern in said second set;
   using the normal clock phase upon recovery of patterns in said first set and one of said average clock phase positions upon recovery of a pattern in said second set associated with said one average clock phase position.

5. A modem with improved clock synchronization in response to group delays of some of the received data patterns comprising:
   means for determining a normal clock phase position;
   means for selecting a first set of data patterns which do not have substantial group delay relative to the normal clock phase position and a second set of data patterns which have substantial group delay relative to the normal clock phase position;
   means for determining for each pattern in said second set an average clock phase position which compensates for the phase difference between the normal clock phase and the phase of each pattern in said second set;
   means for using the normal clock phase upon recovery of patterns in said first set and one of said average clock phase positions upon recovery of a pattern in said second set associated with said one average clock phase position.

* * * * *

UNITED STATES PATENT AND TRADEMARK OFFICE
CERTIFICATE OF CORRECTION

PATENT NO. : 4,797,900

DATED : January 10, 1989

INVENTOR(S) : Steven L. Anderson

It is certified that error appears in the above-identified patent and that said Letters Patent is hereby corrected as shown below:

```
On the Title Page, Item [73],
Assignee should be --UNIVERSAL DATA SYSTEMS, INC.-- and not "MOTOROLA, INC.".
```

Signed and Sealed this

Twenty-fifth Day of September, 1990

Attest:

HARRY F. MANBECK, JR.

*Attesting Officer*    *Commissioner of Patents and Trademarks*